United States Patent Office 3,783,022
Patented Jan. 1, 1974

3,783,022
ELECTROLUMINESCENT PANEL
Fumio Ueda, Amagasaki-shi, Japan, assignor to Mitsubishi Denki Kabushiki Kaisha, Marunouchi Chiyoda-ku, Tokyo, Japan
Filed Apr. 22, 1971, Ser. No. 136,310
Claims priority, application Japan, Apr. 28, 1970, 45/36,563
Int. Cl. C09k 1/00; C23c 11/00; H01j 1/62
U.S. Cl. 117—215
2 Claims

ABSTRACT OF THE DISCLOSURE

An electroluminescent panel having a luminescent layer, a high dielectric layer and a back electrode is disclosed. The luminescent layer is composed of an electroluminescent phosphor containing ZnS as an active ingredient and a binder. The high dielectric layer is composed of high dielectric barium titanate and a binder. After coating by vacuum evaporation of aluminum to form a back electrode, a resin such as cyanoethyl sucrose is vacuum impregnated to the luminescent layer and the high dielectric layer by heating.

BACKGROUND OF THE INVENTION

Field of the invention

This invention relates to an electroluminescent panel having an electroluminescent layer of high luminescent efficiency.

Description of the prior art

In the past electroluminescent panels were formed with a series of resistance layers. These panels, for instance, might contain a luminescent layer, a high dielectric layer and/or a non-linear resistance layer. In forming these layers, it was customary to use various solvents and afterward, the solvent was evaporated. When a solvent was used, however, more or less serious voids were formed in the layer. For instance in panels having a high mixing ratio of electroluminescent material, high dielectric material and non-linear resistant material the problem of void formation was particularly severe. It was thought that void formation could be alleviated by forming the layers using vacuum evaporation techniques, but even in this instance void formation is still encountered.

The presence of voids could seriously affect the operation of the electroluminescent panel, since the voids are characterized in general by low breakdown voltages. Accordingly, when a voltage is applied across an electroluminescent panel in order to cause illumination, the light intensity of the electroluminescent phosphor will be somewhat reduced since the electric field will be mainly applied across the voids. This will cause the electric field across the electroluminescent phosphor to be reduced which will result in an electroluminescent panel of low brightness and low breakdown voltage. Voids also have certain other deleterious effects on the panel. The presence of voids in the luminescent layer will accelerate the decay of the electroluminescent phosphor and may adversely affect the life of the electroluminescent phosphor and reduce heat conductivity. The presence of voids consequently invites non-uniform and irregular illumination so that it is not desirable to have such voids in the high dielectric and non-linear resistant layers whenever these layers are present.

SUMMARY OF THE INVENTION

It is an object of the present invention to remove the disadvantages of electroluminescent panels of the prior art as stated above, and to provide an electroluminescent panel wherein any voids in the luminescent layer, high dielectric layer, or non-linear layer, are impregnated with dielectric materials.

DESCRIPTION OF PREFERRED EMBODIMENTS

Figure 1:
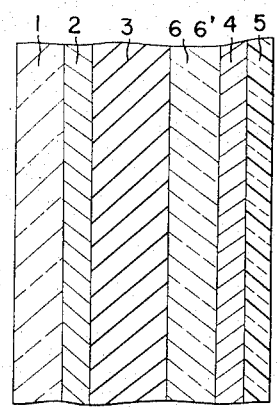
FIG. 1 is a sectional view of a conventional electroluminescent panel.

Referring now to the drawings wherein like reference numerals designate identical or corresponding parts throughout, and more particularly to FIG. 1 thereof, which shows a sectional view of a conventional electroluminescent panel in general, the numeral 1 designates a transmitting and insulating base such as glass or the like, the numeral 2 designates a transparent electrode such as a tin oxide, and the numeral 3 designates a luminescent layer which is formed by hardening an electroluminescent phosphor with a binder. A high dielectric may be admixed into this luminescent layer 3, or the electroluminescent phosphor may be evaporated onto the layer without the use of a binder. The numeral 4 designates a back electrode, such as evaporated aluminum, and the numeral 5 is a protective layer such as an epoxy resin to moisture-proof and protect of the outer surface. In some instances, a high dielectric layer 6 is formed by hardening a high dielectric with a binder. This layer 6 may be provided between the luminescent layer 3 and the back electrode 4 in order to effectively block out light by increasing the voltage resistance of the electroluminescent plate and by reflecting any light which is emitted in the direction of the back surface. This layer 6 may also act to permit easy application of the back electrode to the luminescent layer. When the electroluminescent panel is used as a display panel, a non-linear resistance layer 6 may be formed by hardening a non-linear resistant material with a binder to improve the quality of the picture.

As indicated above, when the layers of the electroluminescent material are formed from a solvent melt, which solvent is later evaporated, voids frequently develop. These voids will develop even if the mixing ratio between the electroluminescent material, the high dielectric material and the non-linear resistant material is high, and even if the layers are formed by vacuum evaporation.

Accordingly, when either an AC or DC voltage is applied across the transparent electrode 2 and back electrode 5 to illuminate the electroluminescent panel, the electroluminescent phosphor will emit a light of relatively low intensity, because the electric field is mainly crossing the voids, which have lower voltage resistances.

Thus, an effective electric field is not being applied across the electroluminescent phosphor, and hence the electroluminescent panel is characterized by low brightness and breakdown voltage. Also, the presence of voids in the luminescent layer 3 will accelerate the decay of the electroluminescent phospor, and particularly if such voids exist in the high dielectric and non-linear resistant layers 6, 6', since it will adversely affect the life of the electroluminescent phosphor, reduce heat conductivity, and invite consequent non-uniformity and irregularity in the illumination.

Figure 2:
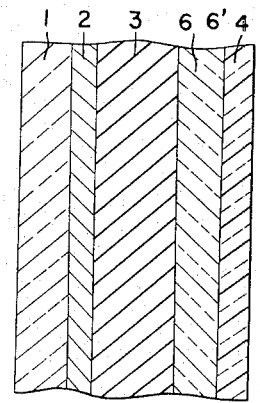
FIG. 2 is a sectional view of an electroluminescent panel illustrating one embodiment of the present invention.

Referring now to FIG. 2, which shows a sectional view in accordance with one embodiment of the present invention, the luminescent layer 3 is composed of an electroluminescent phosphor containing ZnS as a substrate, and a cyanoethyl cellulose as a binder in the volume ratio of which is one to one. The high dielectric layer is composed of a high dielectric barium titanate and Acryloid B-72 as a binder in the volume ratio of one to one. After vacuum evaporation of aluminum as the back electrode 4, cyanoethyl sucrose was heated at 100° C. and vacuum impregnated to the luminescent layer 3 and the high dielectric layer 6. In this structure, the electroluminescent panel was found to have a brightness of several times higher than the same panel without impregnating cyanoethyl cellulose.

Figure 3:
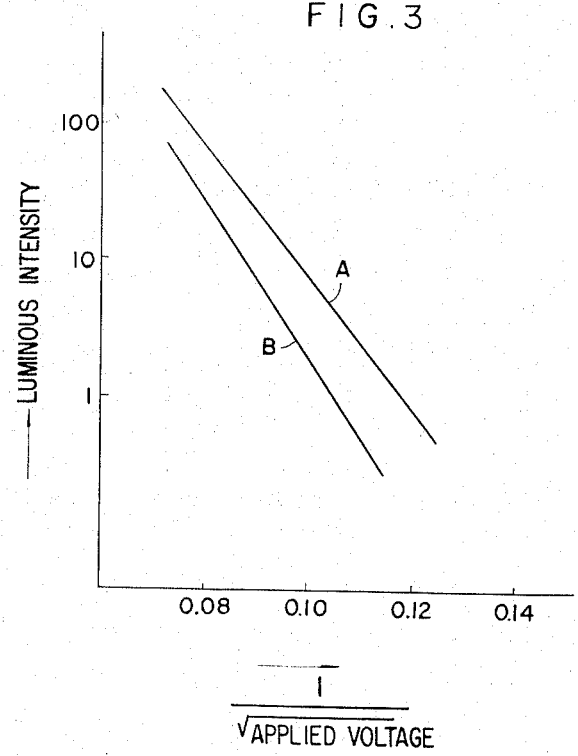
FIG. 3 is a graphical diagram showing the characteristic of luminous intensity of the embodiment shown in FIG. 1 as compared with the prior art.

Referring now to FIG. 3, which shows a graphical diagram illustrating a characteristic of the luminous intensity of the present invention in comparison with the prior art, A is the characteristic of the present invention, while B is the characteristic of the same structure except without the cyanoethyl sucrose. From this diagram, the increase of luminous intensity can be readily recognized. Further, the life of the panel can be extended to almost the same extent as if the panel were operated in vacuo and the breakdown voltage can be increased nearly two to three times greater as compared with the prior art.

Figure 4:
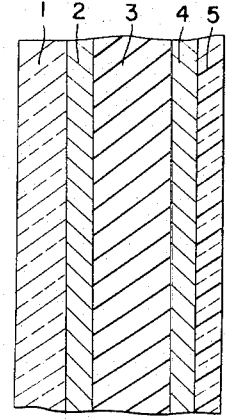
FIG. 4 is a sectional view of an electroluminous panel illustrating another embodiment of the present invention.

FIG. 4 shows another embodiment of the present invention. In this embodiment, the luminescent layer 4 is formed by the electroluminescent phosphor consisting of ZnSSe as a substrate, a barium titanate as the high dielectric and cyanoethyl cellulose as the binder in a volume ratio of 4:1:1. After vacuum evaporation of aluminum as the back electrode 4 to the luminescent layer 3, a silicone oil was impregnated to the luminescent layer 4. It was then hardened with an epoxy resin. If the electroluminescent panel is constructed as above, the breakdown voltage increases by 300% and the brightness increases by 150% as compared with the same electroluminescent panel which has not been impregnated with the silicone oil. The life of the panel is extended to almost the same extent as if it were operated in vacuo.

The dielectric material used for the impregnation is not limited by its dielectric constant and can be applied at any phase during or following the construction of the electroluminescent panel. Also, the method of impregnating the dielectric material is not limited, and the only limitation is that the dielectric material should immerse the voids. Of course, the voids which will be filled or which can be filled are not only those which are naturally formed, but also those which are formed by controlling the amount of generation.

The light used in this specification is not limited to visible light. The reference has been made to the non-linear resistant layer in the above description; however, a non-linear impedance layer can also be treated in the same manner.

Also, it must be understood that the present invention can be applied to an electroluminescent panel having a light amplifier, as an applied element of the electroluminescent panel.

According to this invention, an electroluminescent panel can be formed which is superior in every respect of brightness, life, breakdown voltage and thermal stability of luminescence, and the like.

Obviously, many modifications and variations of the present invention are possible in light of the above teachings. For example, the mixing ratio of the electroluminescent phosphor and the binder, is not limited to the particular volume described above, but it can be altered within a range of 0.1-1:1:1-0.1 by volume. It is therefore to be understood that many changes may be made without departing from the scope or spirit of the invention.

What is claimed as new and desired to be secured by Letters Patent of the United States is:

1. In a method for producing an electroluminescent panel comprising
    (a) forming a transparent electrode layer onto a transmitting and insulating base layer,
    (b) forming a luminescent layer onto said transmitting electrode layer by applying a solvent mixture containing an electroluminescent phosphor and a binder, wherein said solvent is evaporated therefrom to form a hardened layer containing voids therein which occur as a result of the evaporation of said solvent, and
    (c) forming a back electrode layer on said electroluminescent panel
the improvement comprising vacuum impregnating the luminescent layer with a dielectric material to fill said voids.

2. In a method for producing an electroluminescent panel comprising
    (a) forming a transparent electrode layer onto a transmitting and insulating base layer,
    (b) forming a luminescent layer onto said transmitting electrode layer by applying a solvent mixture containing an electroluminescent phosphor and a binder, wherein said solvent is evaporated therefrom to form a hardened layer containing voids therein which occur as a result of the evaporation of said solvent; and
    (c) forming a high dielectric layer onto said luminescent layer by applying a solvent mixture containing a dielectric material and a binder, wherein said solvent is evaporated therefrom to form a hardened layer containing voids therein which occur as a result of the evaporation of said solvent,
the improvement comprising vacuum impregnating the luminescent and high dielectric layers with a dielectric material to fill said voids.

References Cited
UNITED STATES PATENTS

| | | | |
|---|---|---|---|
| 3,310,703 | 3/1967 | Brooks | 313—108 |
| 3,014,813 | 12/1961 | Bouchard et al. | 117—33.5 E |
| 2,936,252 | 5/1960 | Hanlet | 117—211 |
| 3,048,732 | 8/1962 | Lehmann et al. | 117—33.5 E |
| 3,290,536 | 12/1966 | Mager | 313—108 |
| 3,167,677 | 1/1965 | Fremuth | 313—108 |
| 3,306,770 | 2/1967 | Klug et al. | 117—211 |
| 3,247,414 | 4/1966 | Levetan | 117—33.5 E |

FOREIGN PATENTS

| | | | |
|---|---|---|---|
| 751,871 | 1/1967 | Canada | 117—33.5 E |

WILLIAM D. MARTIN, Primary Examiner

W. R. TRENOR, Assistant Examiner

U.S. Cl. X.R.

117—211, 217, 33.5 E; 252—301.3, 301.6; 313—108